United States Patent [19]
Allen et al.

[11] 3,783,760
[45] Jan. 8, 1974

[54] COLLAPSIBLE VIEWING DEVICE

[75] Inventors: Joseph H. Allen, Needham; Richard R. Wareham, Marblehead, both of Mass.

[73] Assignee: Polaroid Corporation, Cambridge, Mass.

[22] Filed: Apr. 20, 1972

[21] Appl. No.: 245,967

[52] U.S. Cl. ............................ 95/11 V, 95/39, 95/42
[51] Int. Cl. ............................................. G03b 19/12
[58] Field of Search ....................... 95/11 V, 39, 42

[56] References Cited
UNITED STATES PATENTS
2,925,022   2/1960   Winkler ................................. 95/42

Primary Examiner—John M. Horan
Attorney—Alfred E. Corrigan

[57] ABSTRACT

A compact folding camera including a plurality of housing sections coupled to each other for movement between folded and extended positions and a collapsible viewing device mounted on one of the housing sections for movement between inoperative and operative positions. An elongated link structure is pivotally coupled intermediate its ends to one of the housing sections and has its opposite ends pivotally and slidably coupled to the viewing device. One end of the link structure is mounted in position to be engaged and rotated by a second housing section, during movement of the housing sections into the folded position, to move the viewing device into its inoperative position. When the camera and the viewing device are in their folded positions, inadvertent movement of the viewing device into its extended operative position is precluded by the engagement between the end of the link structure and the second housing section. Movement of the housing sections of the camera toward the extended position is effective to move the second housing section in a direction away from the end of the link structure, thereby allowing rotation of the link structure to move the viewing device toward the extended operative position.

11 Claims, 3 Drawing Figures

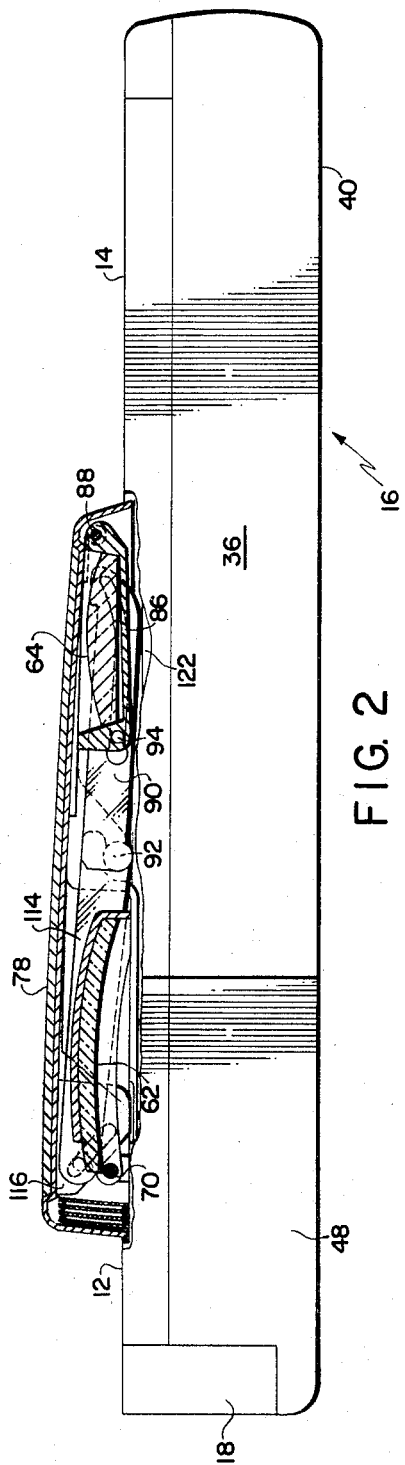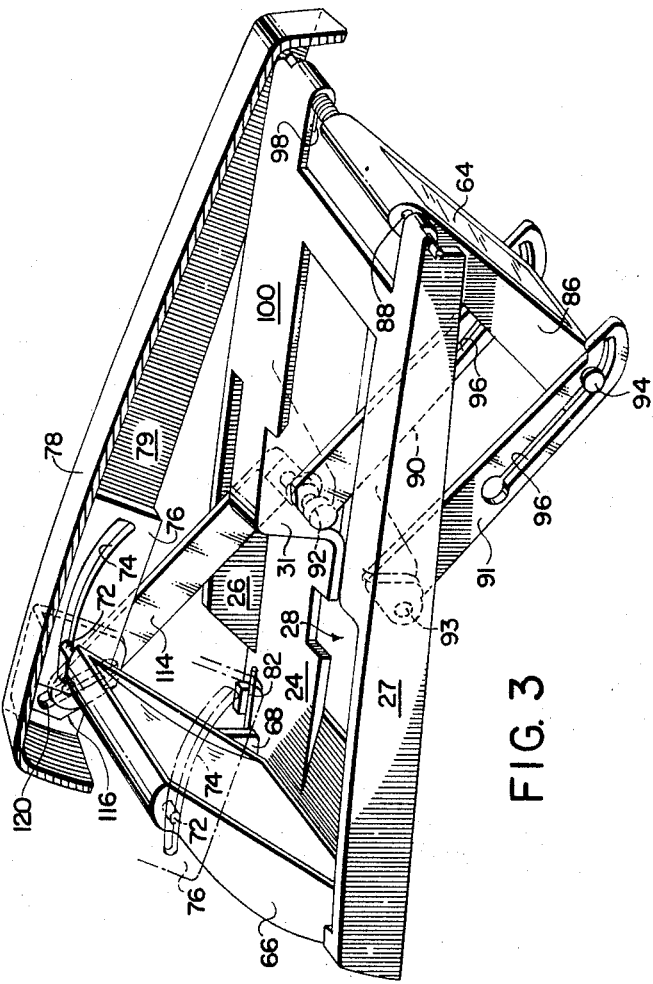

COLLAPSIBLE VIEWING DEVICE

BACKGROUND OF THE INVENTION

1. Field of the Invention

This invention relates to folding cameras of the type including a collapsible viewing device.

2. Description of the Prior Art

It is well known to provide cameras of the folding type with a viewing device, e.g., a rangefinder and/or viewfinder, which is mounted on the camera for movement between inoperative and operative positions. Generally, operation of cameras of the foregoing type involves two independent steps, i.e., moving various housing sections of the camera between their extended and folded positions and moving the viewing device between its operative and inoperative positions. Needless to say, requiring the operator of the camera to perform these independent steps results in a waste of time and effort. Further, cameras of the foregoing type lend themselves to being carried in a pocket or purse when the camera and its viewing device are in their folded inoperative positions. During the period of time that the camera is being carried in a pocket or purse it is important that the viewing device be kept in its folded position. For example, if the viewing device were to inadvertently move toward the extended position while being carried in a pocket or purse, it may be damaged by some object located within the pocket or purse striking an optical element of the viewing device; or a part of the viewing device may become entangled with the lining of the purse or pocket thereby resulting in possible tearing of the lining and/or damage to the viewing device during removal of the camera from the pocket or purse.

SUMMARY OF THE INVENTION

The present invention provides a compact folding camera which includes a viewing device for providing an image of a subject to be photographed. The camera is formed by a plurality of interconnected housing sections, including first and second housing sections, which are coupled for movement between folded and extended positions. The viewing device is mounted on the first housing section and includes a cover, first and second optical elements, and means for guiding the first optical element and cover between a folded, inoperative position and an extended, operative position. In the inoperative position, the first and second optical elements are folded flat against the first and second housing sections for storage and the cover is located in overlying relation to the optical elements. Resilient means are provided for urging the first and second optical elements and the cover to the operative position. The viewing device is provided with a link structure which cooperates with the second housing section to automatically move the viewing device into its folded, inoperative position as the housing sections approach their folded position, and to move the viewing device into its operative position in response to moving the housing sections of the camera toward their extended positions. Specifically, this cooperation is accomplished in part by pivotally mounting the link structure at a point intermediate its ends to the first housing section. One end of the link structure is pivotally and slidably coupled to the cover near a point removed from the cover's pivotal connection to the viewing device. The cover is in turn coupled to one end of the first optical element for guiding the first optical element between the inoperative and operative positions. The other end of the link structure is pivotally and slidably coupled to the second optical element for guiding it between the inoperative and operative positions. Rotation of the link structure about its pivotal connection to the first housing section is effective to rotate the first and second optical elements and the cover between their inoperative and operative positions.

When the camera and viewing device are in the folded position, the end of the link structure connected to the second optical element is located in engagement with the second housing section such that rotation of the link structure in a direction to move the viewing device into the operative position is prevented. The first and second housing sections move relative to each other as the camera is moved toward its extended position thereby resulting in the second housing section moving in a direction away from the end of the link structure. As the second housing section moves as described, the end of the link structure in engagement therewith follows the second housing section thereby pivoting the link structure in a direction to erect the viewing device. After the viewing device enters its erected or operative position, the second housing section moves out of engagement with the link structure and into its extended position wherein it is maintained by any suitable means such as an erecting link.

To fold the camera, the photographer moves the erecting link to a position wherein the various housing sections of the camera may be moved toward the folded position. During folding of the camera, which may be accomplished by pressing down on the viewing device cover or the second housing section, the second housing section moves into engagement with the end of the link structure. Further movement of the sections of the camera toward the folded position is effective to pivot the link structure in a direction to simultaneously move the viewing device into its folded or inoperative position as the camera moves into its folded position.

An object of the invention is to provide a camera of the folding type with a collapsible viewing device having means for maintaining the viewing device in an inoperative position when the camera is folded.

Another object of the invention is to provide a camera of the folding type with a collapsible viewing device which automatically moves into a folded, inoperative position upon folding the camera.

Other objects of the invention will in part be obvious and will, in part, appear hereinafter.

The invention accordingly comprises the apparatus possessing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is an elevational view, partly in section, of the camera and viewing device of FIG. 1 shown in their folded or inoperative positions; and FIG. 3 is an enlarged perspective view, partly in section, of the camera's viewing device shown in a partly collapsed position.

DETAILED DESCRIPTION OF THE INVENTION

Figure 1:
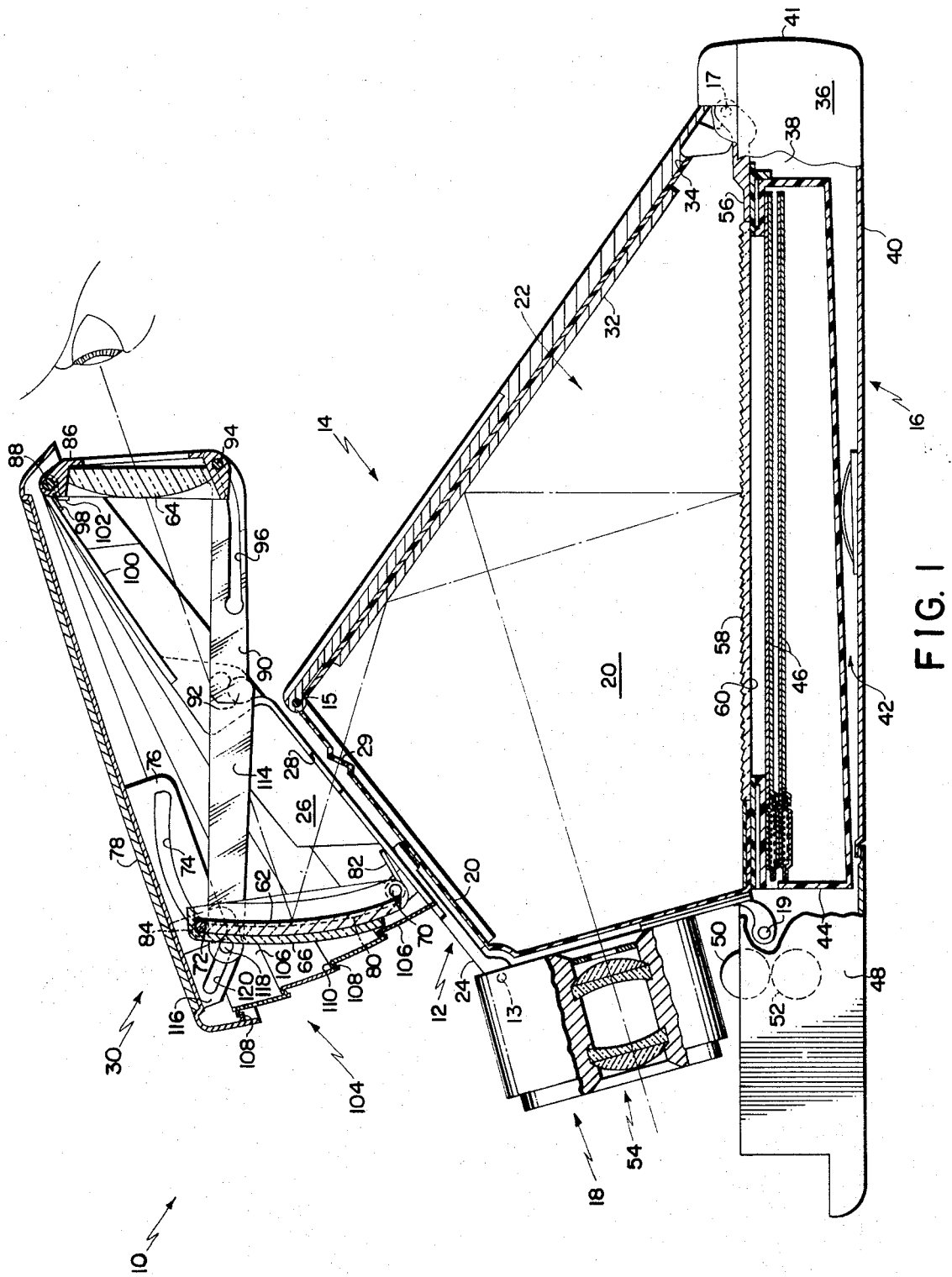
FIG. 1 is an elevational view, partly in section, of a camera and viewing device embodying the instant invention shown in their extended or operative positions.

Reference is now made to FIG. 1 wherein there is shown a foldable, single lens reflex camera 10 of the self-developing type in its extended or operative position. Camera 10 includes first, second, third and fourth housing sections 12, 14, 16 and 18, respectively, pivotally coupled to each other at pivots 13, 15, 17 and 19 for relative movement between the extended operative position shown in FIG. 1 and the inoperative, folded position shown in FIG. 2. Housing sections 12, 14, 16 and 18 cooperate with a flexible bellows 20, secured thereto to form a six-sided exposure chamber 22.

First housing section 12 includes a wall 24 having laterally spaced flanges 26 and 27 (see FIG. 3) mounted thereon and an opening 28 in alignment with an opening 29 in bellows 20. Opening 29 is adapted to allow the passage of light from the exposure chamber 22 to the camera's viewing device 30 and is provided with suitable means for preventing the passage of light therethrough while an exposure is being made. Flanges 26 and 27 provide a means for mounting the viewing device 30 as will be more fully described hereinafter. Second housing section 14, pivotally connected to housing section 12 at 15, includes means (not shown) for mounting a planar mirror 32 on an interior wall 34 thereof. Third housing section 16 includes a pair of laterally spaced side walls 36 and 38 interconnected by a bottom wall 40 and an end wall 41 to define a U-shaped chamber 42 for receiving a film assemblage including a film container 44 having a plurality of individual film units 46 (only two being shown) therein. Extending forwardly of chamber 42 is a U-shaped roller support housing 48 having a pair of rollers 50, 52 mounted thereon in closing relation to the open end of chamber 42. Roller housing 48 is pivotally coupled to third housing section 16 and is adapted to be pivoted in a counterclockwise manner to move rollers 50 and 52 to a position wherein a film container 44 may be inserted into or withdrawn from chamber 42. Finally, fourth housing section 18 is pivotally coupled near its ends to housing sections 12 and 16 and is provided with means for mounting a lens and shutter assembly 54 and a shutter release button (not shown).

Pivotally mounted within exposure chamber 22 is a reflecting means comprising a support 56 having an echelon type reflecting surface 58 on one side thereof and a planar reflecting surface, e.g., a mirror 60, on the other side thereof. The reflecting means is adapted to be pivoted between the position shown in FIG. 1 wherein surface 58 is a component of the camera's viewing system, and a second position wherein surface 58 is closely adjacent to mirror 32 and functions as a component of the camera's exposure system.

A viewing device 30 including first and second optical means 62 and 64, respectively, is mounted on first housing section 12 for movement between an extended, operative position, as shown in FIG. 1, and a folded, inoperative position, as shown in FIG. 2, wherein the optical means 62 and 64 generally lie within the same plane and compliment the compactness of the camera when the latter is in a folded position. The first optical means 62, which is disclosed as a concave mirror, is provided with a first erecting means for guiding the concave mirror 62 between the inoperative and operative positions. The erecting means includes a mirror housing 66 pivotally coupled near its lateral sides by a pin 70 to a tab 68 extending upwardly from wall 14 and to flange 27; a pair of guide pins 72 extending outwardly from opposite sides of mirror housing 66 and adapted to be captured in arcuate guides 74 formed in laterally spaced flanges 76 extending downwardly from a cover 78; and biasing means, e.g., a spring 80 having one end 82 in engagement with wall 24, an intermediate portion wound about pin 70 and the other end 84 curved around a guide pin 72. The second optical means, shown as an eye lens 64, also has an erecting means for guiding the eye lens 64 between its operative and inoperative positions. The latter erecting means includes an eye lens housing 86 pivotally coupled at its lateral ends to flanges 26 and 27 by pin 88, a pair of laterally spaced links 90 and 91, each of which has one end pivotally coupled to a flange 31 extending upwardly from wall 24 and to flange 27 at 92 and 93, respectively, and its other end pivotally and slidably coupled to a lateral side of eye lens housing 86 by a pin 94 extending away from the housing 86 and into a slot 96 in each of links 90 and 91; and a spring having one end 98 in engagement with a rib 100 extending inwardly from flange 26, an intermediate portion wound about pin 88, and its other end 102 in engagement with eye lens housing 86.

Viewing device 30 is also provided with a collapsible or folding shade 104 for reducing admission of ambient light into the area between concave mirror 62 and eye lens 64 thereby increasing the apparent brightness of the image formed by concave mirror 62. The folding shade 104 is formed by a plurality (4) of thin, elongated, U-shaped blades 106, the upper three of which are pivotally coupled near the free ends of the "U" to the rearwardly extending flanges 26 and 27 of housing section 12 at pivot 88. It will be noted from FIG. 1 that the lowest or first blade 106 is fixedly attached at its forward end to the housing section 12 and is of minimum length, measured from pivot 88, and that each succeeding blade is slightly longer than the one below it. This permits the blades to nest in telescoping fashion as the upper three blades are pivoted downwardly in counterclockwise direction, until their bottom edges bear against housing section 12. The three uppermost blades 106 and cover 78 have inwardly turned flanges 108 near their forward bottom edges and all of the blades have outwardly turned flanges 110 at their upper forward edges which are adapted to interlock as the upper three blades 106 are rotated upwardly from housing section 12 for sequentially erecting the blades to the positions shown in FIG. 1. It will be noted, that in the erected position, the individual blades 106 overlap one another, thus preventing ambient light from passing therebetween. Shade 104 is spring biased towards the erected or light-blocking position by any suitable means, e.g., by a pair of springs. For a more detailed description of the viewing device, reference is made to the copending application of Peter F. Costa et al., Ser. No. 141,554, filed May 10, 1971, and now U. S. Pat. No. 3,722,389 granted Mar. 27, 1973. and assigned to the same assignee as the instant application.

Viewing device 30 is provided with link structure or link means for guiding the viewing device between its inoperative, folded position and its extended, operative position and for preventing movement of the viewing device toward its operative position when the camera is folded. Specifically, the link means includes the previously described link 90 and a second link 114. One end of second link 114 is pivotally coupled to flange 31 by pin 92 such that links 90 and 114 move as an integral link. The opposite end of link 114 is coupled to a flange 116, extending downwardly from cover 78, by a pin 118 and slot 120 connection. Stated another way, the link means is pivotally connected intermediate its ends to the first housing section 12 by pin 92 and has its opposite ends pivotally and slidably coupled to the cover 78 and second optical means 64 for guiding the viewing device between its operative and inoperative positions. It will be noted from an inspection of FIG. 2 that the right hand side of the link means, i.e., link 90, is in engagement with a recessed portion 122 of the exterior surface of housing section 14 when the viewing device 30 and the housing sections of the camera are in their folded positions. Therefore, the link means cannot be rotated in a clockwise direction to erect the viewing device as long as the camera is in the folded position.

OPERATION

The link means is constructed such that the camera and viewing device may be moved to their erected, operative positions in a plurality of ways. Preferably, the camera and viewing device are moved to their operative positions by grasping the laterally spaced, longitudinally extending flanges 79 of cover 78 in a vicinity to the right of pivot pins 92 and 93 and applying an upward force thereon. This upward force on cover 78 is transmitted to the first housing section 12 which in turn is applied to housing section 14 via hinge 15 to release the latch connection (not shown) between sections 14 and 16 and rotate section 14 in a clockwise manner about pivot 17. Housing sections 12 and 14 move relative to each other as the camera moves toward its extended position thereby moving housing section 14 in a direction away from links 90 and 91. As housing section 14 moves away from link 90, the upward force on cover 78 is now effective to pivot the link means 90 and 114 in a clockwise direction to move the various components of the viewing device into their operative positions, as shown in FIG. 1. Finally, housing section 14 moves out of engagement with links 90 and 91 and into its extended position wherein the various housing sections are maintained by any suitable means, e.g., a link extending between sections 14 and 16.

Alternatively, the operator may grasp housing section 14 and pivot it in a clockwise direction about hinge 17 to release the aforementioned latch connection between housing sections 14 and 16. This latter movement results in housing sections 12, 14 and 18 being moved about their respective pivots toward the erected position shown in FIG. 1. As housing sections 12 and 14 move relative to each other, housing section 14 attempts to move away from engagement with links 90 and 91, thereby allowing spring 102 to pivot eye lens housing 86 in a counterclockwise direction about hinge 88. Movement of housing 86 in a counterclockwise direction is transmitted to each of the links 90 and 91 by way of pin and slot connections 94 and 96, respectively, to cause links 90 and 91 to rotate in a clockwise direction about hinges 92 and 93. Rotation of link 90 is transferred to link 114 via pin 92 to pivot cover 78 in a clockwise manner about pin 88. This latter rotation of cover 78 is transferred to the first optical means 62 via the pin and slot connection 72 and 74 to rotate the optical means, with an assist from spring 80, in a counterclockwise manner toward the position shown in FIG. 1. The rotation of cover 78 is also effective to move the U-shaped blades 106 into the operative position shown in FIG. 1. Links 90 and 91 continue to follow housing section 14 until pins 94 reach the end of slots 96, at which time optical means 64 is in its operative position. At approximately the same time, pin 72 bottoms out in the left end of slot 74 as optical means 62 is fully erected and pin 118 approaches the bottom of slot 120. The viewing device 30 is now in its operative position. Housing section 14 then moves out of engagement with links 90 and 91 and into the position shown in FIG. 1 wherein the various housing sections are maintained in the erected position by the aforementioned erecting link.

The camera and its viewing system may be moved to their folded, inoperative positions in a plurality of ways. Preferably, after the aforementioned erecting link has been released, a downward force is applied to housing section 14 to rotate it in a counterclockwise direction about hinge 17, thereby resulting in relative movement between housing sections 12 and 14. Housing section 14 moves into engagement with links 90 and 91 to cause counterclockwise rotation of links 90, 91 and 114 thereby resulting in clockwise rotation of optical means 64 and 62 into their inoperative positions as housing sections 12 and 14 move into a common plane. As noted before, the latched connection between housing sections 14 and 16 is made as the housing sections move into their folded position, as shown in FIG. 2, and the link means comprising links 90 and 114 is effective to maintain the viewing device in the inoperative position as long as the camera housing sections remain in their folded position. Alternatively, the camera and viewing device may be folded by applying a downward force to cover 78, thereby causing cover 78 to rotate about hinge 88 in a counterclockwise direction. Counterclockwise rotation of cover 78 is effective to rotate the link means 90 and 114 in a counterclockwise direction which in turn rotates optical means 62 and 64 in a clockwise direction into their inoperative positions.

Since certain changes may be made in the above apparatus without departing from the scope of the invention herein involved, it is intended that all matter contained in the above description or shown in the accompanying drawings shall be interpreted as illustrative and not in a limiting sense. For example, while the link means disclosed herein has been described and shown as including two relatively short and separate links, it is within the scope of the invention to form the link means as one relatively long link having each of its opposite ends connected to one of the optical elements or means and an intermediate portion of the link pivotally connected to the first housing section.

What is claimed is:

1. A folding camera adapted for movement between folded and extended positions and a collapsible viewing device comprising, in combination:

first and second housing section coupled to each other for movement between said folded and extended positions;

a collapsible viewing device mounted on said first housing section, said viewing device including first and second optical means mounted for movement between inoperative and operative positions;

resilient means for biasing one of said first and second optical means toward said operative position; and means pivotally coupled intermediate its ends to said first housing section, said ends including a first end engageable with said viewing device, and a second end engageable by said second housing section during movement of said first and second housing sections toward said folded position for moving said first and second optical means into said inoperative position, said means being operative to prevent movement of said one optical means toward said operative position when said first and second housing sections are in said folded position.

2. A folding camera as defined in claim 1 wherein said viewing device includes cover means pivotally coupled to said first housing section for movement between said inoperative and operative positions.

3. A folding camera adapted for movement between folded and extended positions and a collapsible viewing device comprising, in combination:

first and second housing sections coupled to each other for movement between said folded and extended positions;

a collapsible viewing device mounted on said first housing section, said viewing device including cover means and first and second optical means mounted for movement between inoperative and operative positions;

resilient means for biasing one of said first and second optical means toward said operative position;

link means pivotally mounted intermediate its ends on said first housing section and engageable by said second housing section during movement of said first and second housing sections toward said folded position for moving said first and second optical means into said inoperative position, said link means being adapted to prevent movement of said one optical means toward said operative position when said first and second housing sections are in said folded position; and means coupling one end of said link means to said cover means for guiding said cover means between said inoperative and operative positions.

4. A folding camera as defined in claim 3 further including means coupling the other end of said link means to said second optical means for guiding said second optical means between said inoperative and operative positions.

5. A compact folding camera including a collapsible viewing device for providing an image of a scene to be photographed comprising:

a plurality of housing sections including first and second housing sections coupled to each other for movement between folded and extended positions;

a collapsible viewing device including at least one optical means mounted on said first housing section for movement between inoperative and operative positions; and means pivotally coupled intermediate its ends to said first housing section, said means including a first end coupled to said viewing device for moving said viewing device into said inoperative position and a second end opposite said first end located in position to be engaged by said second housing section for maintaining said viewing device in said inoperative position when said first and second housing sections are in said folded position and for preventing movement of said viewing device toward said operative position while said first and second housing sections are in said folded position.

6. A folding camera as defined in claim 5 further including means for coupling said means mounted on said first housing section to said one optical means for guiding said one optical means between said inoperative and operative positions as said first and second housing sections move between said folded and extended positions.

7. A folding camera comprising:

first and second housing sections pivotally coupled to each other for movement between a folded position wherein portions of said first and second housing sections substantially lie in a common plane and an extended position wherein said first and second housing sections are angularly disposed relative to each other;

a collapsible viewing device pivotally mounted on said first housing section for movement between inoperative and operative positions; and link means pivotally coupled intermediate its ends to said first housing section, said link means including a first end pivotally coupled to said viewing device for controlling the movement of said viewing device between said inoperative and operative positions and a second end, opposite said first end, adapted to be engaged by said portion of said second housing section when said first and second housing sections are in said folded position and said viewing device is in said inoperative position, whereby movement of said first end to move said viewing device toward said operative position is possible only when said first and second housing sections are out of said folded position.

8. A folding camera as defined in claim 7 wherein said viewing device includes first optical means and cover means adapted to overlie said first optical means when said viewing device is in said inoperative position, means pivotally coupling said first optical means to said first housing section and said cover means, said first end of said link means being coupled to said cover means for controlling movement of said cover means and first optical means between said inoperative and operative positions.

9. A folding camera as defined in claim 8 wherein said viewing device includes second optical means pivotally connected to said first housing section, said second end of said link means being pivotally coupled to said second optical means for guiding said second optical means between said inoperative and operative positions.

10. A compact folding camera including a collapsible viewing device for providing an image of a scene to be photographed comprising:

a plurality of housing sections including first and second housing sections coupled to each other for movement between folded and extended positions;

a collapsible viewing device including cover means pivotally mounted near one end of said first housing section and at least one optical means mounted on said first housing section for movement between inoperative and operative positions;

link means pivotally connected intermediate its ends to said first housing section in position to be engaged by said second housing section for maintaining said viewing device in said inoperative position when said first and second housing sections are in said folded position and for preventing movement of said viewing device toward said operative position while said first and second housing sections are in said folded position; and means for pivotally coupling one end of said link means to said cover means for guiding said cover means between said inoperative and operative positions as said first and second housing sections move between said folded and extended positions.

11. A compact folding camera including a collapsible viewing device for providing an image of a scene to be photographed comprising:

first and second housing sections pivotally coupled to each other for movement between a folded position and an extended position wherein said first and second housing sections define two sides of an exposure chamber;

a collapsible viewing device pivotally mounted on said first housing section for movement between inoperative and operative positions; and means pivotally mounted on said first housing section and coupled to said viewing device for preventing movement of said viewing device toward said operative position until said first and second housing sections have been moved toward said extended position, said pivotally mounted means includes link means pivotally connected intermediate its ends to said first housing section, said link means having a first end pivotally coupled to said viewing device and a second end in engagement with said second housing section when said first and second housing sections are in said folded position and said viewing device is in said inoperative position.

* * * * *